(12) United States Patent
Cook et al.

(10) Patent No.: US 9,858,816 B2
(45) Date of Patent: Jan. 2, 2018

(54) DETERMINING PARKING SPACE OCCUPANCY USING A 3D REPRESENTATION

(71) Applicant: Regents of the University of Minnesota, Minneapolis, MN (US)

(72) Inventors: Douglas J. Cook, Maple Grove, MN (US); Vassilios Morellas, Plymouth, MN (US); Theodore L. Morris, Saint Paul, MN (US); Nikolaos Papanikolopoulos, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 14/718,914

(22) Filed: May 21, 2015

(65) Prior Publication Data

US 2015/0339924 A1 Nov. 26, 2015

Related U.S. Application Data

(60) Provisional application No. 62/001,497, filed on May 21, 2014.

(51) Int. Cl.
| | |
|---|---|
| *G06K 9/00* | (2006.01) |
| *G08G 1/14* | (2006.01) |
| *G06T 7/80* | (2017.01) |
| *G06T 7/579* | (2017.01) |
| *G06T 7/593* | (2017.01) |

(52) U.S. Cl.
CPC ............. *G08G 1/14* (2013.01); *G06K 9/0063* (2013.01); *G06K 9/00771* (2013.01); *G06T 7/579* (2017.01); *G06T 7/593* (2017.01); *G06T 7/85* (2017.01); *G08G 1/144* (2013.01); *G08G 1/146* (2013.01); *G06T 2207/10021* (2013.01); *G06T 2207/30236* (2013.01)

(58) Field of Classification Search
None
See application file for complete search history.

(56) References Cited

U.S. PATENT DOCUMENTS

| | | |
|---|---|---|
| 6,501,391 B1 | 12/2002 | Racunas, Jr. |
| 6,750,786 B1 | 6/2004 | Racunas, Jr. |
| 6,946,974 B1 | 9/2005 | Racunas, Jr. |
| 7,492,283 B1 | 2/2009 | Racunas, Jr. |

(Continued)

OTHER PUBLICATIONS

Huang et al. [Vacant Parking Space Detection Based on Plane-based Bayesian Hierarchical Framework, IEEE Transactions on Circuits and Systems for Video Technology, vol. 23, No. 9, Sep. 2013.*

(Continued)

*Primary Examiner* — Manuchehr Rahmjoo
(74) *Attorney, Agent, or Firm* — Schwegman Lundberg & Woessner, P.A.

(57) ABSTRACT

Systems and methods for determining park stall occupancy are disclosed herein. The systems and methods include receiving a three dimensional representation of a parking stall in a parking lot. The systems and methods also include processing the three dimensional representation to determine occupancy of the parking stall. The parking stall has a boundary relative to the area.

19 Claims, 2 Drawing Sheets

(56) References Cited

U.S. PATENT DOCUMENTS

| | | | | |
|---|---|---|---|---|
| 8,698,895 | B2* | 4/2014 | Nerayoff | H04N 7/181 348/148 |
| 8,885,889 | B2* | 11/2014 | Park | G08G 1/168 382/104 |
| 2003/0144890 | A1* | 7/2003 | Dan | G06Q 30/02 705/5 |
| 2011/0143779 | A1* | 6/2011 | Rowe | G06Q 30/02 455/456.3 |
| 2012/0007983 | A1* | 1/2012 | Welch | G07B 15/063 348/148 |
| 2012/0078686 | A1* | 3/2012 | Bashani | G07B 15/02 705/13 |
| 2013/0182905 | A1* | 7/2013 | Myers | H04N 7/18 382/103 |
| 2013/0266188 | A1* | 10/2013 | Bulan | G06K 9/00771 382/104 |
| 2014/0036076 | A1* | 2/2014 | Nerayoff | H04N 7/181 348/148 |
| 2014/0257943 | A1* | 9/2014 | Nerayoff | G06T 7/2093 705/13 |
| 2014/0270381 | A1* | 9/2014 | Wu | G06K 9/00785 382/104 |
| 2014/0369168 | A1* | 12/2014 | Max | G01S 15/878 367/93 |
| 2014/0376769 | A1* | 12/2014 | Bulan | G06K 9/00771 382/103 |

OTHER PUBLICATIONS

Scheunert et al., Free space determination for parking slots using a 3D PMD sensor, Jun. 13-15, 2007, IEEE Intelligent Vehicles Symposium, pp. 154-159.*

Woock et al., Odometry-Based Structure from Motion, Jun. 13-15, 2007, IEEE Intelligent Vehicles Symposium, pp. 1112-1117.*

Cornelis et al, 3D Urban Scene Modeling Integrating Recognition and Reconstruction, 2008, Springer, Int J Comput Vis (2008) 78: 121-141.*

Adan, Antonio, et al., "3D Reconstruction of Interior Wall Surfaces Under Occlusion and Clutter", *2011 International Conference on 3D Imaging, Modeling, Processing, Visualization and Transmission*, (2011), 275-281.

Borrmann, Dorit, et al., "The 3D Hough Transform for Plane Detection in Point Clouds: A Review and a New Accumulator Design", *3D Research*, 3(2), (2011), 1-12.

Izadi, Shahram, et al., "KinectFusion: Real-time 3D Reconstruction and Interaction Using a Moving Depth Camera", *Proceedings, ACM Symposium on User Interface Software and Technology (UIST '11)*, Santa Barbara, CA, (Oct. 2011), 10 pgs.

Cook, Douglas J., et al., "An Automated System for Persistent Real-Time Truck Parking Detection and Information Dissemination", *2014 IEEE International Conference on Robotics and Automation (ICRA)*, (2014), 3992-3993.

Cook, Douglas J., et al., "Parking Space Detection Utilizing 3D Reconstruction Techniques", Thesis, Master of Science, University of Minnesota, (De. 2011), 97 pgs.

Idris, M. Y. I., et al., "Car Park System: A Review of Smart Parking System and its Technology", Information Technology Journal, 8(2), (2009), 101-113.

Morris, Ted, "A Comprehensive Truck Parking Space Availability System for Real-Time Information and Parking Facilities Performance Monitoring", Proceedings of the CLTT Symposium, Gulfport, MS, USA, Feb. 26-27, 2014, (2014), 10 pgs.

Revathi, D., et al., "Smart Parking Systems and Sensors: A Survey", Proceedings of the 2012 International Conference on Computing, Communications and Applications (ICCCA), Dindigul, Tamilnadu, (Feb. 2012), 1-5.

* cited by examiner

DETERMINING PARKING SPACE OCCUPANCY USING A 3D REPRESENTATION

CROSS-REFERENCE TO RELATED APPLICATION

This application is related to and claims priority to U.S. Provisional Application No. 62/001,497, filed on May 21, 2014, the content of which are hereby incorporated in its entirety.

STATEMENT REGARDING FEDERALLY SPONSORED RESEARCH OR DEVELOPMENT

The Government has an interest in the patent as a result of funding derived from U.S. DOT/RITA Grant #WO 24-USDOT/TFAC8812(056).

BACKGROUND

In some regions of the world, commercial heavy vehicle drivers are required to rest and take breaks to mitigate driving accidents while fatigued. Such rules must be balanced against on-time delivery requirements as well as shorter lead times to plan their trips, thereby making location and parking availability of rest area facilities more critical.

In the United States, federal hours of service (HOS) rules have reduced the risk of Commercial Heavy Vehicle (CHV) crashes where driver fatigue has been shown to be a contributing factor.

Although there are many rest area facilities available to truck drivers, a common problem is the difficulty of obtaining information on truck parking availability for these facilities. Privately owned truck stop facilities may have available spaces, but in the absence of accurate and timely parking information, drivers have perceived a lack of available parking and a driver may opt to drive fatigued or park illegally (on highway shoulders or ramps)—both of which are safety hazards.

Increasing the number of truck stops and rest areas, or adding capacity to existing ones, may be either financially intractable, or incompatible with local restrictions. The existing truck parking capacity is not efficiently utilized; some remain almost empty while others are near, or over, capacity. High occupancy levels at rest areas have also been correlated with an increase in truck crash frequency on adjacent highway segments.

Real-time parking monitoring technologies can be described as indirect and direct. Indirect technologies are based on detecting and classifying vehicles at all ingress and egress points of the parking facility and summing the difference over accumulated counts at specified time intervals. The general problem with technologies based on ingress-egress count detection is that small counting and vehicle classification errors can accumulated over time. One example of an indirect technology includes battery-powered magnetometers embedded in the pavement at the egress and ingress locations of the parking facility to estimate occupancy by subtracting the two counts in real-time. Another example of an indirect technology uses camera sensors at the entrance and exit to a parking facility. The camera sensors utilize "trip-wire" detectors to sense vehicle presence and motion, and vehicle length classification. The detection accuracy can be impaired by such factors as poor lighting, vehicle color, shadows, headlights, and flying birds. Furthermore, "trip-wire" counting cannot determine actual occupancy for undisciplined parking, which occurs when drivers straddle parking lane line designations, differ in their maneuvering skills, or where lanes are not delineated.

Various methodologies directly monitor parking spaces using camera sensors. Some have used a foreground/background blob segmentation algorithm based on time-variant mixture of Gaussians combined with shadow removal. One approach ortho-rectifies a 2D camera view of vehicle parking spaces into a top-down viewpoint before segmenting each parking space. A sliding window is passed over the lot to encode the detection result based on probabilities of occupancy using mean color of the space compared to an a priori color feature of the empty space. Other approaches entail computing color histograms of parking space regions defined a priori or using aerial images to train an SVM linear classifier. The performance under various lighting conditions and in view of object occlusion challenges may be problematic.

There are a number of challenges with such 2D image computer vision techniques arising from rapid changes in background illumination, glare, and partial occlusions from overlapping vehicles. These challenges are aggravated with commercial heavy vehicles because of their larger size and height compared to private vehicles.

SUMMARY

Determining occupancy of a parking space is complicated by weather phenomena, visibility, sensor noise, driver behavior, and variability of vehicle characteristics. The present inventors have recognized, among other things, that acceptable accuracy in determining occupancy can be achieved by generating a three dimensional image and processing the data as described herein. Data processing can include registering the image data with world coordinates, segmenting, and classifying. The present subject matter can help improve efficiency and roadway safety.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
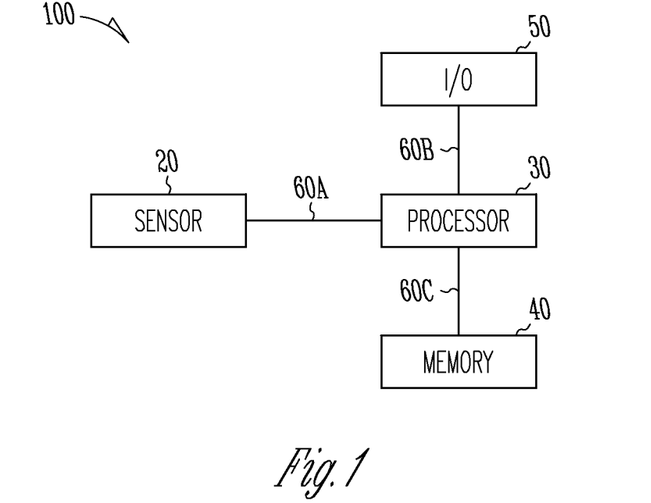
FIG. 1 illustrates a system, according to one example.

FIG. 1 illustrates system 100, according to one example. System 100 includes sensor 20, processor 30, memory 40, and interface 50.

Sensor 20 can include a camera. The camera can be configured to generate data for a two dimensional (2D) image of a scene. Sensor 20 can include a pan, tilt, zoom (PTZ) camera and the camera can be mounted in a fixed position or can be configured for movement. Sensor 20 can include a plurality of cameras, any one of which can have a static location or move relative to the parking facility. For example, sensor 20 can include a camera, or other sensor, that is mounted to a pole or other fixed object at the parking facility and can sweep the parking facility to gather data. In addition, sensor 20 can include a camera, or other sensor, that is mounted to a movable object at the parking facility. For instance, sensor 20 could be mounted to a ground based vehicle (e.g., a golf cart or autonomous vehicle) or an airborne based vehicle (e.g., an aerial drone or other unmanned aerial vehicle (UAV)) that canvases the parking facility to gather data.

Processor 30 can include a computer or server. Processor 30 can include a unitary device or can include any number of distributed devices. Processor 30 can include a digital or analog processor.

Memory 40 can include hardware or media configured to store data or instructions. Data can include a parameter associated with sensor 20, parking facility identification information, 2D or 3D image data, archival data, or other information. Instructions can include a software program that, when executed by processor 30, implements an algorithm for determining occupancy. Memory 40 can include any type of data storage.

Interface 50 can include a user operable interface that allows a user to enter data or instructions and allows a user to receive the results of processing. Examples of interface 50 can include a computer, a keyboard, a touchscreen, a microphone, a speaker, a network interface, or a transceiver. In one example, interface 50 includes a wireless communication channel that allows a vehicle driver to provide and receive data.

System 100 includes communication channels between processor 30 and the various elements. For example, channel 60A provides data communication as to sensor 20; channel 60B provides data communication as to interface 50; and channel 60C provides data communication as to memory 40. Any one or more of channels 60A, 60B, or 60C can include a wired or wireless communication channel. A wired communication channel can include a local area network, a wide area network, or direct electrical or optical connection. A wireless communication channel can include Bluetooth, cellular, or radio frequency communication.

Figure 2A:
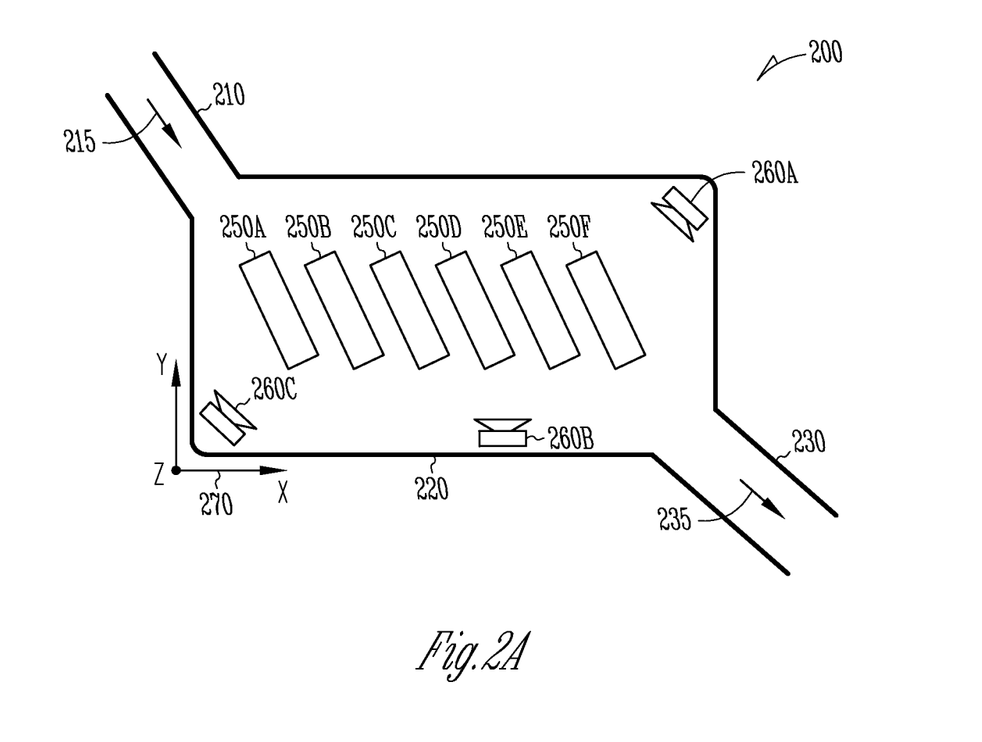
FIG. 2A illustrates a parking facility, according to one example.

FIG. 2A illustrates a parking facility 200, according to one example. Facility 200 can include parking lot 220 and is coupled to a roadway (not shown) by service road 210 and service road 230. Roadway traffic enters parking lot 220 by service road 210 and exits parking lot 220 by service road 230, as indicated by traffic direction arrow 215 and traffic direction arrow 235. Coordinate system 270 provides a frame of reference for parking facility 200.

In the example shown, parking lot 220 has six parking spaces, here denoted as spaces 250A, 250B, 250C, 250D, 250E, and 250F. The boundaries of each parking space, such as parking space 250A, has a rectangular shape corresponding to, for example, a commercial truck. A parking space is sometimes referred to as a parking stall, and throughout this application the terms can be used interchangeably. A parking lot can be thought of as being an area or a volume. For example, the parking surface could define an area and the distance above the parking surface could define a parking volume. In other words, volume and area can be used interchangeably depending upon the context of used. Note that while a parking facility is used as an example, the methods and systems described herein can be used to map and determine occupancy of any type of space or region within a volume or area. For example, the methods and systems described herein could easily be used to determine occupancy of a warehouse. For instance, using the methods and systems described herein the quantity of materials and supplies in a warehouse could be determined. In this instance, a volume can be segmented into areas. For example, a warehouse can have a volume and that volume could be segmented into multiple planes located above a datum plane (e.g., the warehouse floor). Each of the planes could correspond to shelf heights. The areas (e.g., the shelves or space just above the shelves) can then be analyzed using methods and systems described herein to determine if boxes or other items of inventory are located within the areas.

Parking facility 200 includes camera 260A, camera 260B, and camera 260C. In one example, a camera, such as camera 260A, is mounted on a pole and configured to provide a view of parking lot 220. Camera 260A, camera 260B, and camera 260C are configured to provide 2D image data to a processor (such as processor 30).

Figure 2B:
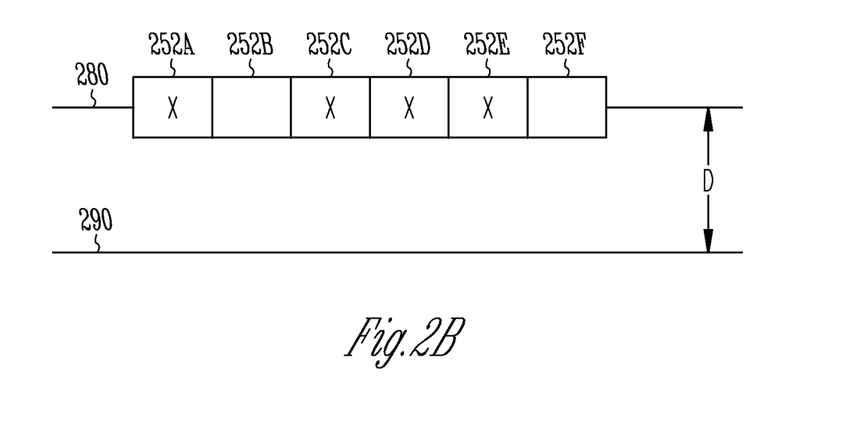
FIG. 2B illustrates parking spot classification, according to one example.

FIG. 2B illustrates an example of parking spot classification. The figure represents an edge view and depicts a surface 290, a plane 280 located a distance D above surface 290, and parking spot registers 252A, 252B, 252C, 252D, 252E, and 252F at plane 280.

Registers 252A, 252B, 252C, 252D, 252E, and 252F correspond to parking spaces 250A, 250B, 250C, 250D, 250E, and 250F in one to one relation. In the example shown in FIG. 2B, registers 252A, 252C, 252D, and 252E are marked with an 'x' to denote a classification indicating an occupied parking space and registers 252B and 252F are unmarked to denote a classification indicating an unoccupied parking space.

Figure 3:
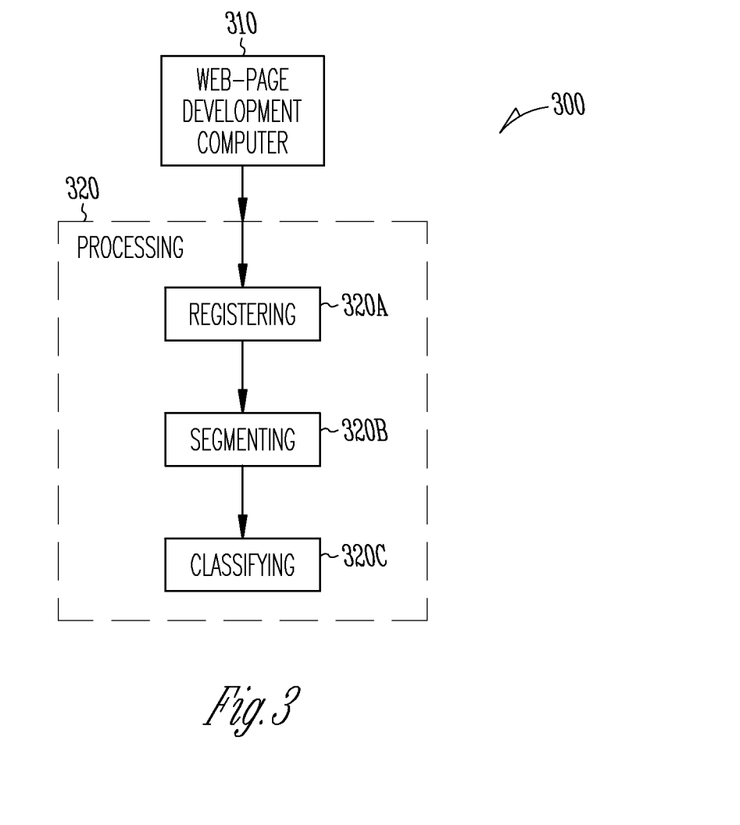
FIG. 3 illustrates a flow chart of a method, according to one example.

FIG. 3 illustrates a flow chart of method 300, according to one example. Method 300 can be implemented using a system, such as system 100 shown in FIG. 1, and corresponding to a parking lot, such as that represented by parking facility 200. The data generated by performing method 300 can indicate classification of a parking spot in a manner such as that shown in FIG. 2B.

Method 300, at 310, includes receiving image data. For example, 3D image data may be received at 310. Receiving image data can include generating a 3D image using a structure from motion technique. Method 300, at 320, includes processing the image data, such as 3D image data, to generate occupancy data. Processing can include: at 320A, registering (and aligning) the image data; at 320B, segmenting the image data; and at 320C, classifying the image data. Processing, as well as other aspects of the present subject matter, is described in the various portions of this document. Method 300 can also include defining portions of the image data as foreground and background and removing the background to determine occupancy. The background can be a baseline used to compare other models against to determine what is foreground.

For example, a background could be a model of a parking facility with no vehicles parked in the parking facility. During use, models could be made of the parking facility using the systems and methods disclosed herein. The model of the parking facility with no vehicles parked in it could then be compared to the new models made during use of the parking facility. In other words, the model that is considered the background could be segmented from the most recent model of the parking facility. Any differences in the two models could be used to indicate that a parking stall is occupied.

In the context of a parking facility the background could be a model of the parking surface and other permanently fixed or stationary objects located within the parking facility without any vehicles present. Non-limiting examples of items that could be considered background materials that could be included in the model include, fuel pumps, awnings or other buildings and structures, markings located on a parking surface as well as the parking surface itself, signage or other barricades that could be located throughout the parking facility on a permanent or temporary basis. For example, traffic cones set up to indicate directions or lanes of travel could, in some instances, be considered background material. Non-limiting examples of the foreground include movable objects within the parking facility such as vehicles, debris or other trash, signage or other barricades that indicate a difference in the parking facility from the model used as the background and that a parking space is unavailable. For instance, barricades or traffic cones could be temporarily set up during repairs to a parking surface. The barricades or traffic cones could, in some examples, be considered foreground material since they would need to be considered when determining availability of parking spaces.

A multiple camera-based system can be configured to directly monitor truck parking occupancy. In addition, a single camera can move about the parking facility along multiple trajectories and collect images that can be used to create a 3D image or 3D representation of the parking facility. Furthermore, multiple types of cameras and space recognition technology can be used to create a representation of the parking facility. Non-limiting examples include a laser scanner, an ultrasonic scanner, depth imaging camera, a microwave scanner, an optical camera, an infrared camera, and a thermal camera.

A 3D representation of the scene can be generated based on Structure from Motion (SfM) techniques. Structure from Motion uses a multiplicity of images from uncalibrated cameras at arbitrary positions which observe a common scene and then use features from these images to reconstruct a 3D representation of the scene which the images observe. In one example, images from three cameras are combined to produce the scene.

Obtaining the 3D structure of scenes with multi-view stereo reconstruction techniques over aforementioned 2D image processing techniques entails using a multiplicity of views that perform photo redundancy checks in order to filter out artifacts arising from signal noise, camera optics, and object motions that displace differently between the images, thereby improving the robustness and accuracy of the reconstructed 3D features.

This approach provides highly detailed accurate 3D geometric surface and point representations of complex urban cityscapes and objects.

Robust segmentation of overlapping, complex objects, under varied lighting can be achieved that typically confound 2D techniques from a single camera.

An example of the present subject matter integrates an implementation of Bundler (to solve for unknown camera intrinsic and extrinsic parameters), and Patched-based Multi-View Stereo 3D dense point reconstruction technique (PMVS) (see FIG. 2A).

After acquiring multiple images, an example of the present subject matter builds a set of putative matching image point coordinates, $x_{i,j}$ across $j=1 \ldots m$ separate camera views using SIFT features. SIFT refers to Scale-invariant feature transform and can be used to detect and describe local features in images.

This approach assumes that, given the transformation from the unknown 3D (4×1) homogeneous world coordinate $X_i$ to the corresponding (3×1) homogeneous image point $x_{i,j}$ is represented by the common perspective transform representation:

$$\lambda \pi x_{i,j} = [K][R|t]X_i \qquad \text{Equation 1}$$

where the K is the (3×3) intrinsic camera parameter matrix, which projects the 3D coordinate onto the image plane, and the upper (3×3) direction cosine matrix R, and the upper (3×1) vector t compose the (3×4) extrinsic matrix, which transposes the world coordinate $X_i$ into the camera frame. The coefficient $\lambda$ represents an arbitrary scale factor.

The Bundler algorithm seeks to minimize the following cost objective function, C, across all camera pairs and given image points:

$$C = \sum_{j=1}^{m} \sum_{i=1}^{n} \|Q(a_j, b_i) - x_{i,j}\|^2 \qquad \text{Equation 2}$$

where $\|\bullet\|^2$ is the L2 norm distance between the estimated image point, $\hat{x}_{i,j} = Q(a_j, b_i)$, and a corresponding actual image point $x_{i,j}$ in Equation 1. The parameter vector represents each of the 12 extrinsic parameters on the right-hand side of Equation 1, and the parameter vector the scaling parameters on the left hand side of Equation 1.

Intrinsic camera parameters associate the pixel coordinates of an image point with the corresponding coordinates in the camera reference frame, some example of which include focal length, image format, principal point, and lens distortion. Extrinsic parameters describe the location and orientation of the camera reference frame with respect to a known world reference frame and include such parameters as the position of the camera center and the heading of the camera in world coordinates.

Computing the derivative of the cost function (Equation 2) and rearrangement of Jacobian derivative matrix terms, results in a sparse block matrix which is then solved efficiently using gradient-based optimization methods. Equations 1 and 2 can be generalized to any number of camera views, without the requirement that each image coordinate should match in all m camera views as well as different image point scaling models. In one example, the present subject matter utilizes $4^{th}$ order lens scale distortion correction.

An iterative method, such as RANdom SAmple Consensus (RANSAC), can be used to remove outlier putative matches $x_{i,j}$ as determined by the computed L2 norm difference between $x_{i,j}$ and $\hat{x}_{i,j}$. Additional optimizations can be performed using RANSAC to refine the parameter estimation. For one example of a truck parking system, an initial focal length estimate for each camera is input into the Bundler algorithm. A camera can be a PTZ camera.

The bundled camera transform and intrinsic solutions also contain a sparse set of 3D coordinate point correspondences for the complete scene which are insufficient for discriminating vehicles and subsequent space occupancy detection. Semi-dense 3D reconstruction is achieved using patch-based multi-view stereo (PMVS) using the estimated intrinsic and extrinsic parameters for each camera in Equation 1.

The essence of PMVS uses a localized surface patch model to perform putative matches of associated image points falling on the epipolar lines between each set of camera pairs. In one example having three cameras, there are n(n−1)/2=3 such camera pairs. A small image patch is projected onto a surface patch which is then rotated (pitch and yaw) with respect to the camera image planes. The reconstruction algorithm performs an iterative process of matching, expanding, and filtering.

Matching can include matching patches p in $\mathbb{R}^2$, along epipolar lines using normalized cross-correlation based on either Harris corner point or Difference of Gaussian features starting at the closest point candidate to the image plane (a patch size of 5×5 pixels provides good results for one example). In each putative match, an initial 3D center position for each patch, c(p) in $\mathbb{R}^3$ and its surface normal n(p) in $\mathbb{R}^3$ is used to compute a normalized cross-correlation score. The values c(p) and n(p) are obtained by iteratively rotating the surface patch until the highest normalized cross-correlation score is obtained. The correlation score and location surface patch data are associated with 2×2 pixel cells containing the image coordinates. Expansion includes marching through remaining empty cells with a similar process. Filtering entails performing photo-consistency checks, using the surface patch parameters and depth information to resolve surface discontinuities; for example, if a person or part of a vehicle enters one camera view but is not present in the others, or water droplets on the protective lens cover of the enclosure during snow or rain precipitation, or glare, and so on, which will similarly affect photo-consistency between each of the camera views. Matching, expansion and filtering can be repeated until all the cells have been tested amongst the camera pairs.

In this utilization of Bundler/PMVS, camera focal lengths and CCD element size can be utilized as initialization parameters for Bundler, with a large penalty weighting set for focal length as the camera calibrations indicates that focal length remained nearly constant.

The aforementioned optimization solution for intrinsic and extrinsic multi-camera parameters are expressed in an arbitrary scale and world coordinate system and are affected by the initial putative matches between the captured image sets. A registration procedure can be performed to re-scale, translate, and rotate the resulting dense reconstruction to align with the parking lot surface. In one example, this includes back projecting image points corresponding to surveyed point locations that can be identified across the camera pairs, into the Bundler solution coordinate system as inputs to the alignment estimation procedure.

Registration and Alignment

The 3D end-lane and mid-lane locations, $L_i$, i=1 ... m, for each parking stall can be surveyed using a global positioning system (GPS) or a DGPS (differential GPS) system with sub-decimeter accuracy.

As each image set $I_n$; n=1 ... 3, in a time sample s is acquired, the Bundler intrinsic and extrinsic parameters are determined for each camera. Then for each camera image $I_n$ in the set of images, image points, $p_{i,n}$, are extracted which correspond to a visible 3D survey points $L_i$. The intrinsic and extrinsic solution are used to back-project each undistorted 2D coordinate $p'_{i,n}$ into its equivalent world coordinate, $\hat{L}_i$ using each camera pair, (j, k). With three cameras, there will be 3×(3−1)/2=3 back projection solutions, for a given $\hat{L}_i$ with j, k={{1,2}, {2,3}, {1,3}}. For each back projected 3D coordinate $\hat{L}_i$ a 3D back-projection error vector, $\epsilon_{i,(k,j)}$, is computed as the difference vector orthogonal to the two closest 3D points, $\alpha_j$, $\beta_k$ lying on each of two normal direction rays, $u_j = p_{i,j}'/f_j$, $u_k = p_{i,k}'/f_k$ emanating from the camera pair (j, k) focal centers, $c_j$, $c_k$, i.e., $$\epsilon_{i,(k,j)} = \alpha_j - \beta_k \qquad \text{Equation 3}$$

$$\hat{L}_i = \epsilon_{i,(k,j)}/2 + \alpha_j \qquad \text{Equation 4}$$

where $$\alpha_j = c_j + a_j \cdot (u_j - c_j)/d$$

$$\beta_k = c_k + a_k \cdot (u_k - c_k)/d \qquad \text{Equations 5 and 6}$$

With the scalars $a_j$, $a_k$ and, d computed by:

$$a_j = (u_k - c_k) \times (c_j - c_k) \cdot (u_j - c_j) \times (u_k - c_k)$$

$$a_k = (u_j - c_j) \times (c_j - c_k) \cdot (u_j - c_j) \times (u_k - c_k)$$

$$d = (c_j - c_k) \times (u_k - c_k) \cdot (u_j - c_j) \times (u_k - c_k)$$

Three estimates of $\hat{L}_i$ are computed and retained: 1) the mean value between all camera pairs, 2) the minimum error $\epsilon_{i,(k,j)}$, estimate of $\hat{L}_i$, and 3) the estimate associated with the largest projection angle the between $u_j$ and $u_k$. For each set of estimates, RANSAC with least-squares fit of a plane is used to eliminate outliers out-of-plane plane points. The remaining set of r back projected coordinates in the acquired time sample s are then used to estimate an optimal uniform scale factor, $S_s$, rotation matrix, $R_s$, and translation vector, $t_s$. The algorithm includes first normalizing each coordinate $\hat{L}_i$ and $L_i$ relative to their respective point centroids:

$$\hat{l}_{s,i} = (\hat{L}_i - \hat{\rho}_s)/\|\hat{L}_i - \hat{\rho}_s\| \qquad \text{Equation 7}$$

$$l_i = (L_i - \rho_s)/\|L_i - \rho\| \qquad \text{Equation 8}$$

$$\hat{\rho}_s = \frac{1}{r} \cdot \sum_{n=1}^{r} \hat{L}_{i,n}, \qquad \text{Equation 9}$$

$$\rho = \frac{1}{r} \cdot \sum_{n=1}^{r} L_{i,n},$$

The normalized representations in Equations 7 and 8 are then expressed in quaternion form, with the real component, $q_0$ equal to zero. The rotation, $\hat{q}R_s$, of normalized coordinates $\hat{l}_{s,i}$ into $l_i$ is also expressed as a quaternion through Euler's formula, which is then augmented row-wise and solved in the least square sense, constraining $\|\hat{q}R_s\|=1$:

$$\hat{q}_{l,s} \times \hat{q}R_s - \hat{q}R_s \times q_l = 0 \qquad \text{Equation 10}$$

Then the uniform estimate of scale $S = \|L_i - \rho\|/\|\hat{L}_i - \hat{\rho}_s\|$ follows from Equations 7 and 8 and the translation into the reference survey coordinate system is then computed by:

$$t_s = \rho - \rho_s \cdot S_s \qquad \text{Equation 11}$$

From the time sample s the three separate sets of r matched points ($\hat{L}_i$, $L_i$) are used to compute their representative rotation, translation and uniform scale parameters defined in Equation 11 and Equation 10. A final representative set is selected based on the aforementioned transformation parameters which produce the smallest RMS error between the transformed back projected coordinates, $\hat{L}_i'$ and $L_i$.

An RMS error of 0.5 meters may be observed along any axis which resulted in significant detection errors. A second alignment refinement step can be developed to correct for non-linear scale effects in the real-world 3D space. A first order correction in the horizontal x, y plane is estimated from the matching set, of r correspondences, $\hat{L}_i'$ and $L_i$, while a second order correction model to correct elevation $\Delta Z$, can be estimated using the dense transformed 3D PMVS reconstruction data:

$$\Delta X = a_o + a_1 \cdot g_x + a_2 \cdot g_y \quad \text{Equation 12A}$$

$$\Delta Y = b_o + b_1 \cdot g'_x + b_2 \cdot g_y \quad \text{Equation 12B}$$

$$\Delta Z = c_o + c_1 \cdot g_x + c_2 \cdot g_y + c_3 \cdot g_x \cdot g_y + c_4 \cdot g_x^2 + c_5 \cdot g_y^2 \quad \text{Equation 12C}$$

where $g_{(\,)}$ in Equations 12A, 12B, and 12C refer to the x, y, z components of the transformed dense PMVS reconstruction points, $\hat{g}_i'$.

The elevation correction procedure searches for good candidate dense points that are representative of the parking lot surface using the following two-step filtering method. The first filtering step is achieved by placing an elevation boundary above, and below, the plane based on the aforementioned RMS error along vertical axis relative to the reference survey points $\hat{L}_i$. Then the remaining set of dense reconstruction points are filtered based on thresholding the estimated PMVS patch surface normals directional deviation from a parking lot surface normal estimate. Experimentation can determine that deviations less than |20°| from the survey estimated parking lot plane normal provides robust characterization of elevation (surface) distortion. This procedure reduced the RMS error between $\hat{L}_i'$ and $L_i$ to within 0.3 m under most cases, which has proven thus far to provide sufficient alignment for robust classification.

In one example, a classifier is based on the point probabilities (FIG. 2B) which lie above the aligned parking lot plane, and within a specified 3D parking lane cell, defined by planar boundaries aligned to the front, back, left, right parking lane lines, and a horizontal plane placed at a predetermined distance above the surface. In one example, the horizontal plane is placed at D=5 meters above the surface. A decision boundary can be derived from an initial training set of daytime and nighttime detections collected, for example, during various seasons or months. A decision boundary which minimizes type I errors (False Positives, e.g. incorrectly classified occupancy state) and type II errors (False Negatives, missed occupancy) can be determined using a Golden Search algorithm.

The system disclosed herein can be deployed at a rest area which is accessible to traffic on a roadway. An example of a rest area (e.g., parking facility 200) is illustrated in FIG. 2A. The rest area includes a single row of parking spaces each having dimensions of 4.26 m wide and 26.0 m in length. Three pole-mounted cameras can be placed about the perimeter of the parking facilities. A camera can be a commercial off-the-shelf (COTS) HD 1920×1090 PTZ network camera equipped with a multi-view SfM algorithm.

In the example illustrated, six parking spaces are captured simultaneously by overlapping three PTZ cameras such that their focal centers are approximately aligned with a 55-degree horizontal field of view. A computer can be configured to execute instructions to implement an algorithm as described herein. The detection algorithm parking status can be configured to update periodically.

A software system architecture can be configured to monitor region-wide parking availability and information dissemination. The occupancy data can be packaged as reports containing the image acquisition time, a site identification information, the coded parking occupancy states, and a unique user identifier (UUID) for each data set collected. The reports can be uploaded to a data distribution server and communicated to users by way of a cellular service.

Upon receipt of an occupancy report from a given site, the server records the reception time and stores the report in a relational database. The database stores meta-information for each site; geographic location information and parking capacity. A web interface provides access to the occupancy data. In addition to the web interface, the data can also be disseminated to a vehicle operator by an in-cab interface, and to a roadside changeable message sign.

The SfM data provides a rich source of data which can be exploited to extract facility performance measures such as level of private vehicle use.

In addition to using a plurality of 2D camera images, one example can include using two dimensional data from other sources. For example, a laser scanner can provide a 2D representation of a facility from which a 3D image can be generated. In addition, a microwave scanner or an ultrasonic scanner can provide 2D representation data from which a 3D image can be generated.

In an example, sensors that provide 3D depth and intensity image data directly can be employed. For example, a flash 3D LIDAR camera sensor can generate a 3D point cloud. In some examples, the use of the 3D depth and intensity image data can be used to supplement the 2D images or a 3D representation that is created using 2D images. The 3D point cloud can be subsequently aligned with the parking surface area by identifying depth image coordinates of prescribed parking lane boundaries. This can be done utilizing a multiplicity of sensor positions as described previously and in conjunction with Equations 3-11 or directly by identifying the references within the 3D depth image itself. For example, as described herein, the sensors can have a fixed location at a parking facility or can be movable about a parking facility.

Furthermore, parking lot surface extraction can also be achieved utilizing only 3D point cloud position data. This can be accomplished by first performing a transformation of the parameters that describe the surface. For instance, a Hough-space transformation can be utilized to create a Hough space. In an example, ball model cells (the discretized cells are described with a spherical coordinate representation of the parking surface plane) can accumulate surface parameter votes to improve accuracy. A significant reduction in parameter search time can be achieved by discretizing 3D points into a Cartesian grid with predefined cell sizes and range (e.g., 'voxels), as well as a weight attribute that is directly correlated with the number of 3D points that lie within the grid, and by utilizing a look up table to access the locations of the 3D points that lie within the grid. The result is a significantly reduced sparse set of 3D points to parameterize into a Hough space. The dominate plane can be searched in the Hough space by finding a maximum number of votes that is the shortest distance from the known parking lot reference surface. Inaccuracies from the voxel and discretization of the Hough space can be reduced since further refinement of the alignment of the point cloud onto the surface follows the aforementioned example implementation and from Equations 12A-12C.

Various Notes

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method comprising:
receiving a plurality of two dimensional images of a parking stall within a parking facility, wherein receiving the plurality of two dimensional images includes receiving the plurality of images from a single imaging source that is movable along a trajectory relative to the parking facility, and wherein the trajectory includes a predefined path;
generating a three dimensional representation of the parking stall using the plurality of two dimensional images and based on association of matching portions in the plurality of two dimensional images;
registering the three dimensional representation to align with the parking facility; and
processing the three dimensional representation to determine occupancy of the parking stall, the parking stall having a boundary relative to the parking facility.

2. The method of claim 1, wherein receiving the plurality of images includes receiving the plurality of images from at least one two dimensional imaging source.

3. The method of claim 2, wherein the at least one two dimensional imaging source includes at least one of an optical camera, an infrared camera, and a thermal camera.

4. The method of claim 1, wherein generating the three dimensional representation includes processing an image received from at least one of a laser scanner, an ultrasonic scanner, and depth imaging camera.

5. The method of claim 1, wherein generating the three dimensional representation includes using an iterative process and estimated parameters based on camera locations, the camera locations corresponding to the plurality images.

6. The method of claim 1, wherein registering includes back projecting.

7. The method of claim 1, wherein registering includes accessing global positioning (GPS) data.

8. The method of claim 1 wherein processing the three dimensional representation includes evaluating point probabilities at a specified height above a plane of the parking facility.

9. A system comprising:
a sensor including at least one camera configured to provide data corresponding to a plurality of two dimensional images of a parking facility, the parking facility having a plurality of parking spaces on a parking surface, wherein the at least one camera is movable along a trajectory relative to the parking facility, and wherein the trajectory includes a predefined path;
a processor coupled to the sensor and configured to receive the data, the processor configured to execute instructions to generate a three dimensional representation of the parking facility based on the data and based on association of matching portions in the plurality of two dimensional images, and the processor configured to register the three dimensional representation to align with the parking facility and determine occupancy of a selected parking space of the parking facility based on evaluating the three dimensional representation at a predetermined height above the parking surface; and an interface coupled to the processor and configured to provide information as to occupancy of the plurality of parking spaces.

10. The system of claim 9, wherein the sensor includes a plurality of cameras, including at least one camera at a fixed location relative to the parking facility.

11. The system of claim 9, wherein the instructions are configured to segment the three dimensional representation.

12. The system of claim 9, wherein the instructions are configured to classify the three dimensional representation.

13. The system of claim 9, wherein the interface includes a network interface.

14. The system of claim 9, wherein the interface includes a wireless communication channel.

15. A system comprising:
   a sensor configured to provide two dimensional data corresponding to a parking facility, the parking facility having a plurality of parking spaces on a parking surface, wherein the sensor is movable along a trajectory relative to the parking surface, and wherein the trajectory includes a predefined path;
   a processor coupled to the sensor and including instructions that, when executed by the processor, cause the processor to:
      receive the two dimensional data, execute instructions to generate a three dimensional representation of the parking facility based on the two dimensional data and based on association of matching portions in the plurality of two dimensional data, register the three dimensional representation to align with the parking facility and determine an occupancy status of each of the plurality of parking spaces of the parking facility based on evaluating the three dimensional representation of the parking facility; and
   an interface coupled to the processor and configured to provide information as to the occupancy status.

16. The system of claim 15, wherein the three dimensional representation includes a three dimensional point cloud.

17. The system of claim 16, wherein the instructions further cause the processor to segment the three dimensional representation.

18. The system of claim 17, wherein the instructions further cause the processor to classify the three dimensional representation.

19. The system of claim 15, wherein the instructions further cause the processor to segment a foreground from a background.

* * * * *